US010348978B2

(12) United States Patent
Lee et al.

(10) Patent No.: US 10,348,978 B2
(45) Date of Patent: Jul. 9, 2019

(54) PROCESSOR SELECTING BETWEEN IMAGE SIGNALS IN RESPONSE TO ILLUMINANCE CONDITION, IMAGE PROCESSING DEVICE INCLUDING SAME, AND RELATED METHOD FOR IMAGE PROCESSING

(71) Applicant: SAMSUNG ELECTRONICS CO., LTD., Suwon-si, Gyeonggi-do (KR)

(72) Inventors: Ser Hoon Lee, Yongi-si (KR); Choon Seung Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/844,205

(22) Filed: Dec. 15, 2017

(65) Prior Publication Data
US 2018/0352169 A1 Dec. 6, 2018

(30) Foreign Application Priority Data

Jun. 2, 2017 (KR) ........................ 10-2017-0069040

(51) Int. Cl.
*H04N 9/73* (2006.01)
*H04N 5/243* (2006.01)
(Continued)

(52) U.S. Cl.
CPC ........... *H04N 5/243* (2013.01); *H04N 5/2258* (2013.01); *H04N 5/23232* (2013.01); *H04N 5/23238* (2013.01); *H04N 5/23296* (2013.01)

(58) Field of Classification Search
CPC .................................................. H04N 5/2258
See application file for complete search history.

(56) References Cited

U.S. PATENT DOCUMENTS 6,788,960 B2 9/2004 Masutani et al.
7,561,191 B2 7/2009 May et al.
(Continued)

FOREIGN PATENT DOCUMENTS

JP 2003018445 A 1/2003
JP 4068869 A 10/2003
(Continued)

OTHER PUBLICATIONS

GSMARENA.com; Huawei P11 rumored to have three cameras on the back for 40MP snaps; Dec. 6, 2017; all (Year: 2017).*

*Primary Examiner* — Gary C Vieaux
(74) *Attorney, Agent, or Firm* — Volentine, Whitt & Francos, PLLC

(57) ABSTRACT

An image processing device is provided. The image processing device comprising a first lens, a second lens disposed on one side of the first lens, a third lens disposed on the other side of the first lens, a first image sensor which receives an input of a first image obtained from the first lens to generate a first image signal, a second image sensor which receives an input of a second image obtained from the second lens to generate a second image signal, a third image sensor which receives an input of a third image obtained from the third lens to generate a third image signal, a selector which receives the input of the second image signal and the third image signal, outputs the second image signal under a first condition, and outputs the third image signal, under a second condition different from the first condition and an image processor which performs image processing, using the first image signal and an output signal of the selector.

17 Claims, 17 Drawing Sheets

(51) Int. Cl.
*H04N 5/225* (2006.01)
*H04N 5/232* (2006.01)

(56) References Cited

U.S. PATENT DOCUMENTS

| | | | |
|---|---|---|---|
| 9,055,181 B2 | 6/2015 | Ogasahara | |
| 9,438,792 B2* | 9/2016 | Nakada | H04N 5/23229 |
| 10,156,706 B2* | 12/2018 | Shabtay | H04N 5/247 |
| 2002/0152557 A1* | 10/2002 | Elberbaum | H04N 5/2253 |
| | | | 8/405 |
| 2008/0219654 A1* | 9/2008 | Border | H04N 5/23212 |
| | | | 396/89 |
| 2013/0258244 A1 | 10/2013 | Fang | |
| 2015/0334309 A1* | 11/2015 | Peng | H04N 13/271 |
| | | | 348/47 |
| 2016/0028949 A1* | 1/2016 | Lee | H04N 5/06 |
| | | | 348/218.1 |
| 2016/0050374 A1 | 2/2016 | Shabtay et al. | |
| 2016/0360103 A1 | 12/2016 | Griffith et al. | |
| 2017/0186163 A1* | 6/2017 | Kim | H04N 5/2258 |
| 2017/0208234 A1* | 7/2017 | Wang | H04N 5/2258 |

FOREIGN PATENT DOCUMENTS

| | | | |
|---|---|---|---|
| JP | 2005099265 A | * | 4/2005 |
| JP | 2005099265 A | | 4/2005 |
| JP | 4210189 B2 | | 1/2009 |

\* cited by examiner

PROCESSOR SELECTING BETWEEN IMAGE SIGNALS IN RESPONSE TO ILLUMINANCE CONDITION, IMAGE PROCESSING DEVICE INCLUDING SAME, AND RELATED METHOD FOR IMAGE PROCESSING

This application claims priority from Korean Patent Application No. 10-2017-0069040 filed on Jun. 2, 2017, the subject matter of which is hereby incorporated herein by reference.

BACKGROUND

The present inventive concept relates to processors, image processing devices including a processor, and methods of processing an image using an image processing device.

Certain image processing devices may include multiple camera modules respective images, collectively referred to as multiple images. Accordingly, such image processing devices may process multiple images to generate a single image.

In order to acquire a relatively high quality image, a given camera module may include a dual sensor. A camera module including a dual sensor may include, for example, a wide angle lens and a telephoto lens, where the combined capabilities of the wide angle lens and telephoto lens may advantageously be used during zoom operations, for example, performed in a relatively high illuminance environment. However, this is not the case in relatively low illuminance environments, where light levels are insufficient to realize the benefits of the telephoto lens.

SUMMARY

An aspect of the present inventive concept provides a processor capable of improving the performance of a zooming operation when the illuminance is high, an image processing device including the processor, and a method for processing image.

Another aspect of the present inventive concept provides a processor capable of improving image quality even when the illuminance is low, an image processing device including the processor, and a method for processing image.

Still another aspect of the present inventive concept provides a processor capable of reducing a rectification error on the images obtained by each lens, an image processing device including the processor, and a method for processing image.

The aspects of the present inventive concept are not limited to those mentioned above and another technical problem which has not been mentioned can be clearly understood by those skilled in the art from the description below.

According to some embodiments of the present inventive concept, there is provided an image processing device comprising a first lens, a second lens disposed on one side of the first lens, a third lens disposed on the other side of the first lens, a first image sensor which receives an input of a first image obtained from the first lens to generate a first image signal, a second image sensor which receives an input of a second image obtained from the second lens to generate a second image signal, a third image sensor which receives an input of a third image obtained from the third lens to generate a third image signal, a selector which receives the input of the second image signal and the third image signal, outputs the second image signal under a first condition, and outputs the third image signal, under a second condition different from the first condition and an image processor which performs image processing, using the first image signal and an output signal of the selector.

According to some embodiments of the present inventive concept, there is provided a processor comprising an image processor which receives provision of a first image signal from a first camera module and a first selector which receives provision of a second image signal from a second camera module, receives provision of a third image signal from a third camera module, outputs the second image signal under a first condition, and outputs the third image signal under a second condition different from the first condition, wherein the image processor performs image processing, using the first image signal and an output signal of the first selector.

According to some embodiments of the present inventive concept, there is provided a method for image processing comprising receiving a first image signal from a first camera module by a first signal processor to perform first image signal processing, receiving a second image signal from a second camera module and receiving a third image signal from a third camera module by a selector to output the second image signal under a first condition and output the third image signal under a second condition different from the first condition and generating an output image by an image processor, using the output signal of the first signal processor and the output signal of the selector.

BRIEF DESCRIPTION OF THE DRAWINGS

The above and other aspects and features of the present inventive concept will become more apparent upon consideration of certain exemplary embodiments thereof with reference to the attached drawings, in which.

DETAILED DESCRIPTION

Certain image processing devices according to embodiments of the inventive concept will be now be described in some additional detail with reference to FIGS. 1 to 8.

Figure 1:
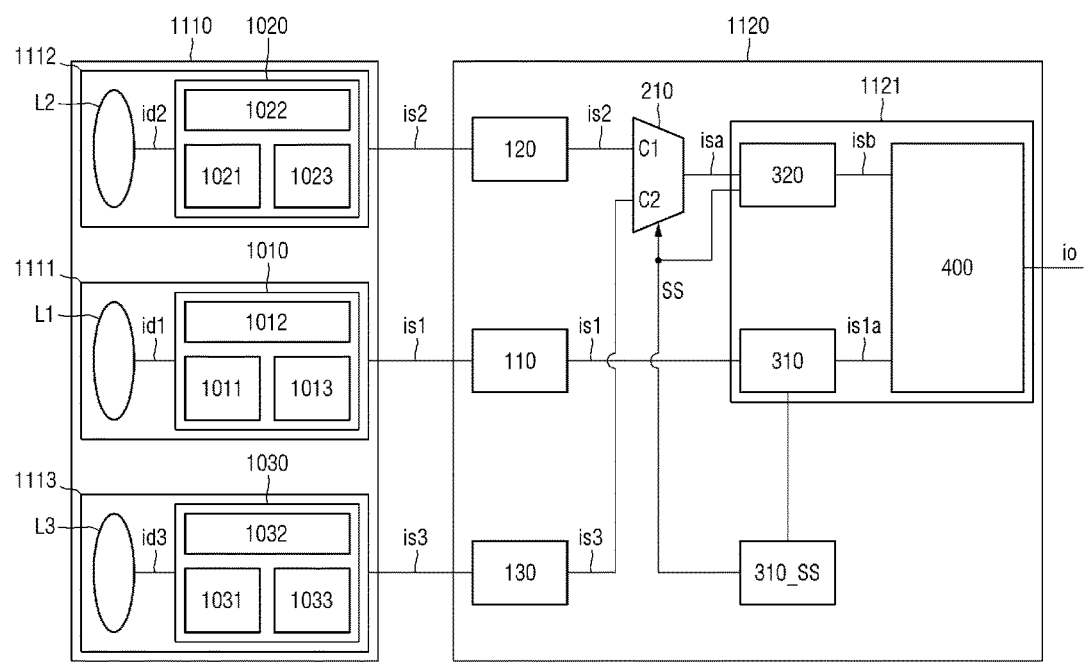
FIG. 1 is a block diagram illustrating an image processing device 10 according to some embodiments of the inventive concept.

FIG. 1 is a block diagram illustrating an image processing device according to embodiments of the inventive concept, where the image processing device generally includes a camera module 1110 and a processor 1120.

Image signals (e.g., is1, is2, and is3) respectively generated by the camera module 1110 are provided to the processor 1120, such that the processor 1120 may process the one or more of the image signals (e.g., is1, is2, and is3) in a manner that generates the output image io. In the illustrated embodiments, various conventionally understood elements may be optionally incorporated between the camera module 1110 and processor 1120. For example, the respective image signals (e.g., is1, is2, and is3) generated by the camera module 1110 may be provided to the processor 1120 via certain constituent elements and/or interfaces disposed between the camera module 1110 and processor 1120.

In the illustrated embodiment of FIG. 1, the camera module 1110 includes a first camera module 1111, a second camera module 1112, and a third camera module 1113, where the first camera module 1111 includes a first lens L1 and a first image signal output unit 1010; the second camera module 1112 includes a second lens L2 and a second image signal output unit 1020; and the third camera module 1113 includes a third lens L3 and a third image signal output unit 1030.

Here, at least one of the first lens L1 and third lens L3 may be a different type of lenses when compared to the second lens L2. For example, the first lens L1 and third lens L3 may be wide angle lenses, and the second lens L2 may be a telephoto lens.

Figure 2A:
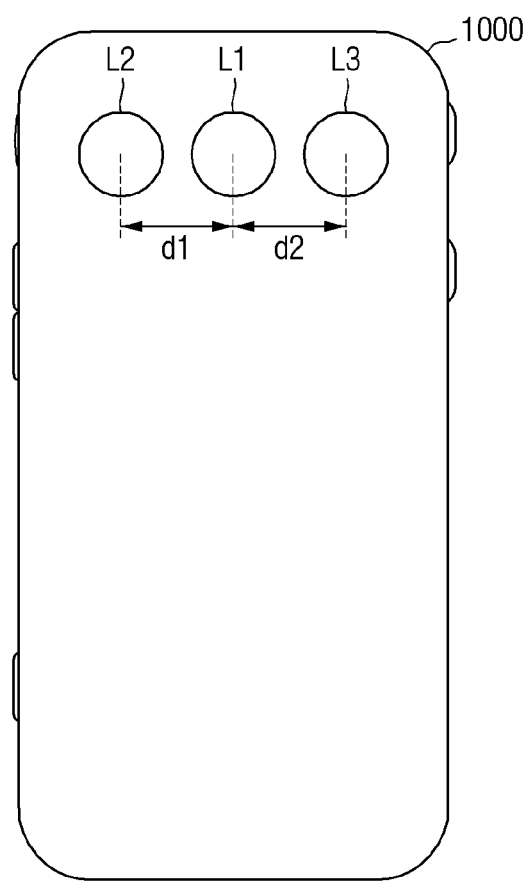
FIGS. 2A and 2B are respective views illustrating exemplary configurations for the first, second and third lenses of FIG. 1.
Figure 2B:
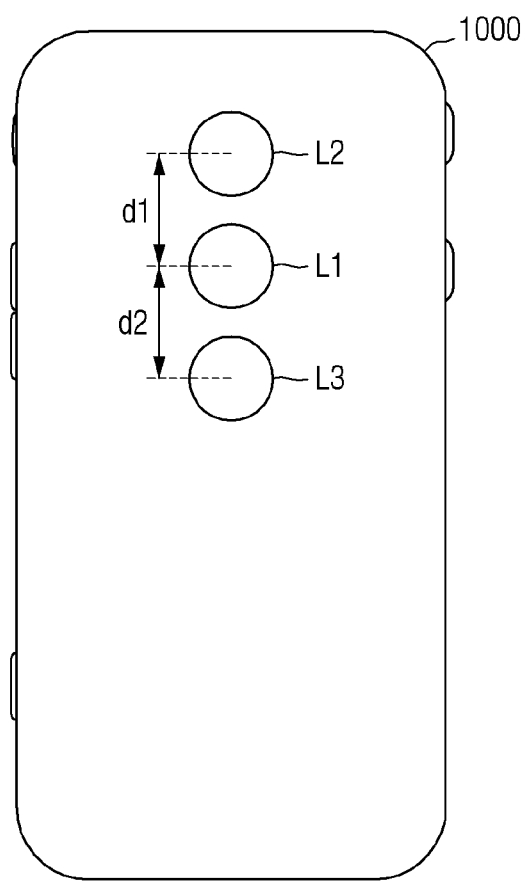

FIGS. 2A and 2B are respective views illustrating exemplary configurations of the first L1, second L2, and third L3 lenses of FIG. 1.

Referring to FIG. 2A, the first lens L1, second lens L2 and third lens L3 are horizontally disposed across one side surface (e.g., a front side or a rear side) of the body of an electronic device 1000 (e.g., a mobile phone). In certain configurations, the second lens L2 is disposed on one side of the first lens L1 while the third lens L3 is disposed on the opposing (or other) side of the first lens L1. In FIG. 2A, the second lens L2 and third lens L3 are disposed symmetrically about the first lens L1. That is, assuming that the second lens L2 is spaced apart from the first lens L1a on one side by a first distance d1 and the third lens L3 is spaced apart from the first lens L1 on the other side by a second distance d2, the illustrated embodiment of FIG. 2A assumes that the first distance d1 and second distance d2 are substantially the same. However, this need not always be the case in other embodiments of the inventive concept.

In the illustrated embodiment of FIG. 2A, centers of the first lens L1, second lens L2, and third lens L3 are linearly disposed along horizontal line, assuming for purposes of this description an arbitrary definition of the term "horizontal" as meaning a direction across the width of the electronic device 1000. Using this assumed definition, the illustrated embodiment of FIG. 2B vertically disposes the centers of the first lens L1, second lens L2 and third lens L3 along a substantially same vertical line.

Referring to FIGS. 2A and 2B, when an object is disposed to face the first lens L1, the subject and the first lens L1 are arranged in alignment with each other, and the first distance d1 and the second distance d2 are different from each other, the angles at which light is reflected from the subject is incident to each of the first lens L1, the second lens L2 and the third lens L3 will be different from each other.

Therefore, when accurately representing the subject, uncompensated (or unrectified) distortion may be present in the images (e.g., id1, id2, and id3) obtained from each of the first lens L1, the second lens L2 and the third lens L3. That is, since the first distance d1 and second distance d2 are different from each other, some degree of distortion between the images (e.g., id1, id2, and id3) may become severe.

In order to correct the foregoing image distortion, a rectification operation may be performed on each of the images (e.g., id1, id2, and id3) obtained from each of the first lens L1, second L2 and third lens L3. At this time, since the degree of distortion between the images (e.g., id1, id2, and id3) may be severe, errors of the rectification operation may be correspondingly large. And if the resulting rectification operation error is large, the noise (artefact) of the output image (e.g., io) may become large.

In image processing devices, like the image processing device of FIG. 1, the second lens L2 and the third lens L3 may be respectively spaced apart from the first lens L1 at substantially the same interval (e.g., first distance d1=second distance d2). And where the first distance d1 is substantially the same as the second distance d2, the degree of distortion between the images (e.g., id1, id2, and id3) may be significantly reduced over configurations wherein the first distance d1 and second distance d2 are substantially different. Therefore, with respect to rectification operation(s) subsequently performed on the respective images (e.g., id1, id2, and id3), the rectification error may be reduced.

Referring back to FIG. 1, the first image signal output unit 1010 may include, for example, a first image sensor 1011, a first storage device 1012, and a first analog-to-digital converter 1013; the second image signal output unit 1020 may include, for example, a second image sensor 1021, a second storage device 1022, and a second analog-to-digital converter 1023; and the third image signal output unit 1030 may include, for example, a third image sensor 1031, a third storage device 1032, and a third analog-to-digital converter 1033.

Each of the first image id1, the second image id2, and the third image id3 is respectively obtained from the first lens L1, second lens L2 and third lens L3. The first to third images id1, id2, and id3 may then be respectively provided to the first output unit 1010, second output unit 1020, and third output unit 1030. And each of the first, second and third image sensors 1011, 1021, and 1031 may be used to respectively sense the first, second and third images id1, id2, and id3.

Hence, the first image sensor 1011 (e.g., a color image sensor) receives the first image id1 to generate the first image signal is1; the second image sensor 1021 (e.g., a color sensor) receives the second image id2 to generate the second image signal is2; and the third image sensor 1031 (e.g., a monochrome image sensor) receives the third image id 3 to generate the third image signal is3.

Calibration data of each of the first, second and third camera modules 1111, 1112, and 1113 may be respectively stored in the first, second and third storage devices 1012, 1022, and 1032, where the term "calibration data" may include, for example, information associated with a degree of rotation for a corresponding camera module, focal length, and/or optical axis.

Each of the first, second and third analog-to-digital converters 1013, 1023, and 1033 may be used to respectively convert the format of the first, second and third image signals id1, id2, and id3. For example, it is possible to respectively convert the first, second and third image signals id1, id2, and id3 having an analog format into a corresponding digital signal (i.e., first image signal is1, second image signal is2, and third image signals is3).

The first, second and third image signals is1, is2, and is3 respectively provided by the first, second and third camera modules 1111 to 1113 may be input to the processor 1120. In the illustrated embodiment of FIG. 1, the processor 1120 includes first, second and third interfaces 110, 120, and 130, a first selector 210, a first signal processor 310, a second signal processor 320, and a first image generator 400. However, this is just one of many particular arrangement of elements and/or functions that may be used to implement a processor in various embodiments of the inventive concept.

However, in the illustrated embodiment of FIG. 1, the first, second and third interfaces 110, 120, and 130 may respectively be used to change one or more signal formats compatible with the first, second and third image sensors 1011, 1021 and 1031 to a format more compatible the processor 1120. Here, the first, second and third interfaces 110, 120, and 130 may be, for example, a camera serial interface (CSI).

In FIG. 1, the first image signal is1 is provided to the first signal processor 310 via the first interface 110; the second image signal is2 is provided to the first selector 210 via the second interface 120; and the third image signal is3 is provided to the first selector 210 via the third interface 130. The first selector 210 receives, as inputs, the second image signal is2 and the third image signal is3, and in response to a selection signal SS, the first selector 210 outputs a selected one of the second image signal is2 and the third image signal is3, as a first image output signal isa provided to the image processor 1121. In some embodiments, the first selector 210 may be disposed separately from the second signal processor 320 of the image processor 1121.

Using the foregoing embodiment as a working example, the selection signal SS may be configured in relation to one of a first condition C1 (e.g., a logic value of '0')—selecting the second image signal is2, or a second condition C2 (e.g., a logic value of '1')—selecting the third image signal is3. In this regard, the first condition C1 and second condition C2 may be different conditions. For example, the first condition C1 may indicate a high illuminance environment (i.e., illuminance greater than a predetermined value) and the second condition C2 may indicate a low illuminance environment (i.e., illuminance less than the predetermined value). In this context, the term "illuminance" is used to denote a brightness of a location associated with an imaged subject as obtained (e.g.,) from the first lens L1 of the first camera module 1111.

In some embodiments, the first signal processor 310 may be used to sense illuminance and communicate corresponding illuminance information to the selection signal generator 310_SS, where the selection signal generator 310_SS is used to generate the selection signal SS in response to the illuminance information. In the illustrated embodiment of FIG. 1, the selection signal generator 310_SS is shown as being disposed in the processor 1120, but this need not always be the case in other embodiments of the inventive concept. For example, the selection signal generator 310_SS may be a hardware component disposed external to the processor 1120, or a software component providing the selection signal generation function.

In FIG. 1, the image processor 1121 of the processor 1120 receives the first image signal is1, as well as the combination of the output signal isa of the first selector 210 and the selection signal SS in order to generate the output image io. Here, the image processor 1121 includes the first signal processor 310, second signal processor 320, and first image generator 400.

The first signal processor 310 receives the first image signal is1 as an input and performs first image signal processing to provide a first image signal is1*a* to the first image generator 400. In this configuration, for example, the first image signal is1*a* provided by the first signal processor 310 may be the first output signal is1 subjected to a first image signal processing by the first signal processor 310.

Figure 3:
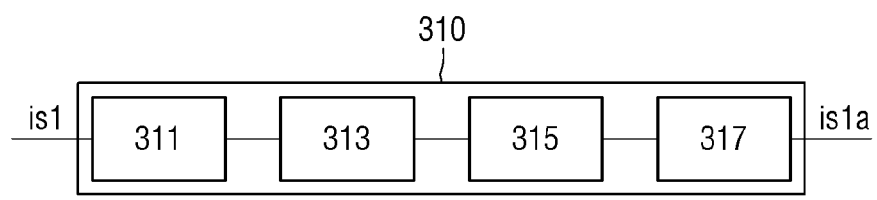
FIG. 3 is a block diagram further illustrating in one embodiment the first signal processor 310 of FIG. 1.

FIG. 3 is a block diagram further illustrating in one embodiment the first signal processor 310 of FIG. 1.

Referring to FIG. 3, the first signal processor 310 may include a first format converter 311, a first noise removal unit 313, a first image enhancer 315, and a second format converter 317. The first image processing performed by the first signal processor 310 may include sequentially passing the first image signal is1 through the first format converter 311, first noise removal unit 313, first image enhancer 315, and second format converter 317 in order to generate the first output signal is1*a* having an appropriate signal format.

That is, the first format converter 311 may receive the first image signal is1, change its format and provide the format-changed first image signal to the first noise removal unit 313. In this regard, the first image signal is1 may have a format defined in accordance with a specific form of color filter arrangement used by the first camera module 1111. For example, the first format converter 311 may convert the format of the first image signal is1 to the conventionally understood RGB format in circumstances where, for example, the first image sensor 1011 of the first camera module 1111 includes a Bayer color arrangement. In this case, the first format converter 311 may convert the format of the first image signal is1 to the RGB format. The first format converter 311 may, for example, perform a demosaic operation. In other embodiments, operation of the first format converter 311 may be omitted according to the type of color filter of the first image sensor 1011 of the first camera module 1111.

The first noise removal unit 313 may be used to remove one or more noise components from the output signal provided by the first format converter 311, and provide the resulting noise-filtered output signal to the first image enhancer 315.

In turn, the first image enhancer 315 receives the noise-filtered output signal from the first noise removal unit 313 performs signal processing that improves the quality of the resulting signal, and provides the quality-improved output signal to the second format converter 317. For example, the first image enhancer 315 may be used to remove a false color component from the noise-filtered output signal provided by the first noise removal unit 313, or may be used to perform a sharpening operation, or the like.

The second format converter 317 receives the quality-improved signal provided by the first image enhancer 315 and may be used to convert the format of this signal into a format compatible with the first image generator 400. For example, the quality-improved signal provided by the first image enhancer 315 may have a RGB format that is converted to (e.g.,) a YUV format including luminance information and color information using the second format converter 317.

Referring again back to FIG. 1, the second signal processor 320 receives the first image output signal isa from the first selector 210 and performs a second image signal processing in order to generate a second image output signal isb that is format compatible with the first image generator 400.

Figure 4:
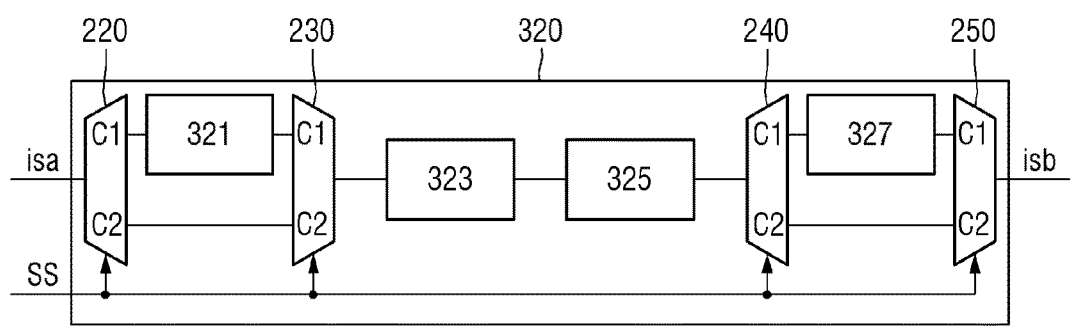
FIG. 4 is a block diagram further illustrating in one embodiment the second signal processor 320 of FIG. 1.

FIG. 4 is a block diagram further illustrating in one embodiment the second signal processor 320 of FIG. 1.

Referring to FIG. 4, the second signal processor 320 may include a second selector 220, a third format converter 321, a third selector 230, a second noise removal unit 323, a second image enhancer 325, a fourth selector 240, a fourth format converter 327, and a fifth selector 250. The second image signal processing performed by the second signal processor 320 may include generation of a second image output signal isb having a desired format with respect to the first image output signal isa received from the first selector 210. The selection signal SS provided to the first selector 210 may also be input to the second to fifth selectors 220, 230, 240, and 250.

When the selection signal SS includes information corresponding to the first condition C1, the first image output signal isa of the first selector 210 may be the second image signal is2. In this case, the second selector 220 may provide the second image signal is2 to the third format converter 321 on the basis of the selection signal SS.

The third format converter 321 may receive the input of the second image signal is2 and convert the format of the second image signal is2 to provide the second image signal to the third selector 230. The third format converter 321 may be substantially the same as the first format converter 311 (see FIG. 3) of the first signal processor 310.

Under the first condition C1, the third selector 230 may provide the output signal of the third format converter 321 to the second noise removal unit 323, based on the selection signal SS.

The second noise removal unit 323 may receive the input of the output signal of the third selector 230 and remove the noise of the output signal of the third selector 230 to provide the output signal to the second image enhancer 325. The second noise removal unit 323 may be substantially the same as the first noise removal unit 313 (see FIG. 3) of the first signal processor 310.

The second image enhancer 325 may receive the input of the output signal of the second noise removal unit 323 and execute the work for improving the quality of the second image signal is2 to output the output signal to the fourth selector 240. The second image enhancer 325 may be substantially the same as the first image enhancer 315 (see FIG. 3) of the first signal processor 310.

Under the first condition C1, the fourth selector 240 may provide the output signal of the second image enhancer 325 to the fourth format converter 327, based on the selection signal SS.

The fourth format converter 327 may convert the format of the output signal of the second image enhancer 325 to provide the output signal to the first image generator 400. The fourth format converter 327 may be substantially the same as the second format converter 317 (FIG. 3) of the first signal processor 310.

When the selection signal SS includes information corresponding to the second condition C2, the output signal isa of the first selector 210 may be the third image signal is3. In this case, the second selector 220 and the third selector 230 may provide the third image signal is3 to the second noise removal unit 323, based on the selection signal SS. The third image sensor 1031 of the third camera module 1113 may be a black and white image sensor. Therefore, the format conversion work using the third format converter 321 may be unnecessary for the third image signal is3.

The second noise removal unit 323 may receive the input of the third image signal is3 and remove the noise of the third image signal is3 to provide the third image signal to the second image enhancer 325. The second image enhancer 325 may receive the output signal of the second noise removal unit 323 and execute the work for improving the quality of the output signal of the second noise removal unit 323 to provide the output signal to the fourth selector 240.

Under the second condition C2, the fourth selector 240 may provide the output signal of the second image enhancer 325 to the fifth selector 250, based on the selection signal SS. Under the second condition C2, the fifth selector 250 may output the output signal of the second image enhancer 325 as the output signal isb, based on the selection signal SS. That is, the format conversion work using the fourth format converter 327 may be unnecessary for the third image signal is3.

Referring again to FIG. 1, the first image generator 400 may perform the image processing and generate the output image io, using the output signal is1a of the first signal processor 310 and the output signal isb of the second signal processor 320.

Figure 5:
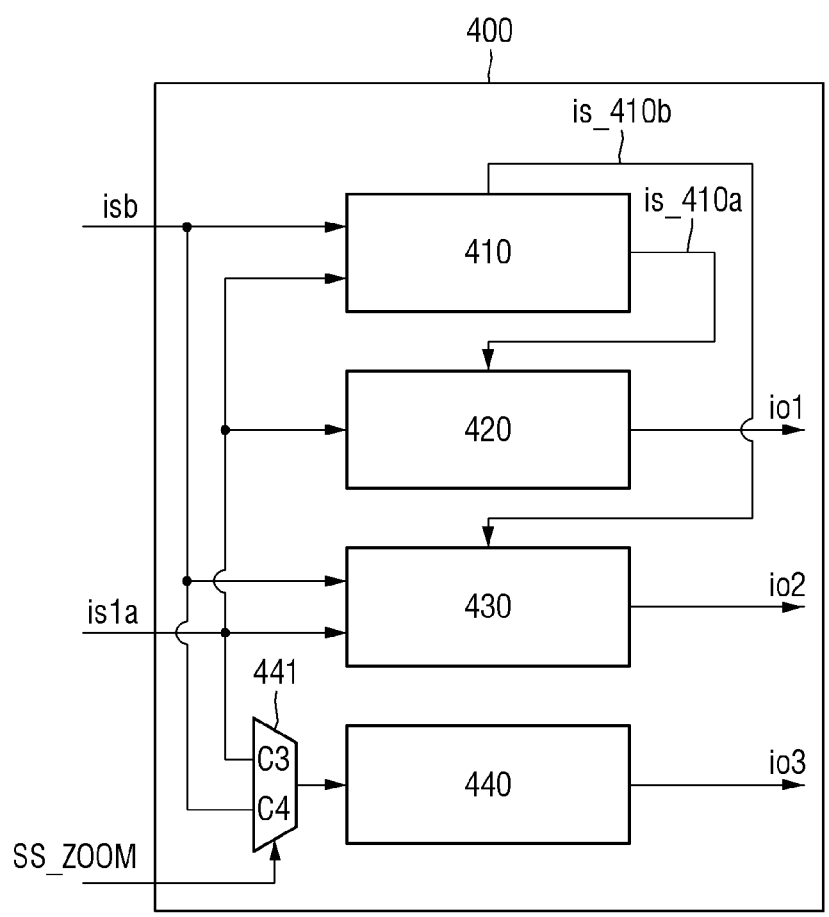
FIG. 5 is a block diagram further illustrating in one embodiment the first image generator 400 of FIG. 1.

FIG. 5 is a block diagram further illustrating in one embodiment the first image generator 400 of FIG. 1.

Referring to FIG. 5, the first image generator 400 includes a depth information generation unit 410, a first output image generation unit 420, a second output image generation unit 430, and a third output image generation unit 440. In some embodiments, the image processing performed by the first image generator 400 may include generation of the two image signals isb and is1a as a single image (e.g., io1 or io2), using the depth information generation unit 410, the first output image generation unit 420, the second output image generation unit 430, and the third output image generation unit 440.

The depth information generation unit 410 may receive the input of the two image signals isb and is1a and output the depth information is_410a and the corresponding disparity information is_410b.

Figure 6:
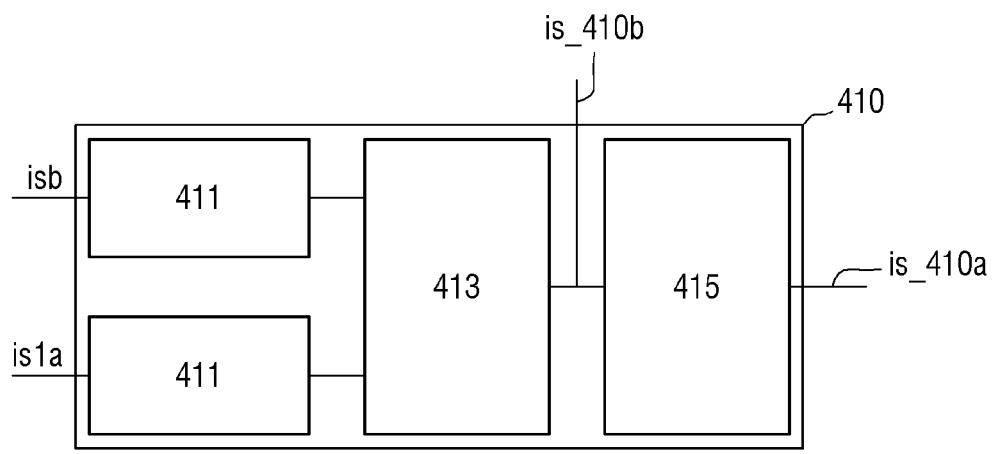
FIG. 6 is a block diagram further illustrating in one embodiment the depth information generator 410 of FIG. 5.

FIG. 6 is a block diagram further illustrating in one embodiment the depth information generation unit 410 of the first image generator 400 of FIG. 5.

Referring to FIG. 6, the depth information generation unit 410 may include an adjusting unit 411, a corresponding disparity information generator 413, and a depth information generator 415.

Each of the two image signals isb and is1a may be input to the adjusting unit 411. Two adjusting units 411 may be disposed to correspond to the two image signals isb and is1a. The adjusting unit 411 may perform a rectification work for correcting the distortion of each of the two image signals isb and is1a. That is, the adjusting unit 411 may rectify the two image signals isb and is1a so as to be row-aligned. In the course of the rectification work, the adjusting unit 411 may use, for example, calibration data and the like stored in the first to third storage devices 1012, 1022, and 1032 of the first to third camera modules 1111, 1112, and 1113.

The respective outputs of the adjusting unit 411 may be input to the corresponding disparity information generator 413. The corresponding disparity information generator 413 may search corresponding points in each of the output signals of the adjusting unit 411, and may calculate the corresponding disparity of the output signal of the adjusting unit 411 in which the two image signals isb and is1a are rectified. The corresponding disparity information generator 413 may output the corresponding disparity information is_410b. The corresponding disparity information is_410b may be, for example, a corresponding disparity map.

The corresponding disparity information is_410b may be provided to the depth information generator 415. The depth information generator 415 may convert the corresponding disparity information is_410b by the disparity to generate the depth information is_410a. The depth information is_410a may be, for example, a depth map.

Referring again to FIG. 5, the first output image generation unit 420 may receive the input of the output signal is1a and depth information is_410a of the first signal processor 310 to generate the first output image io1.

Figure 7:
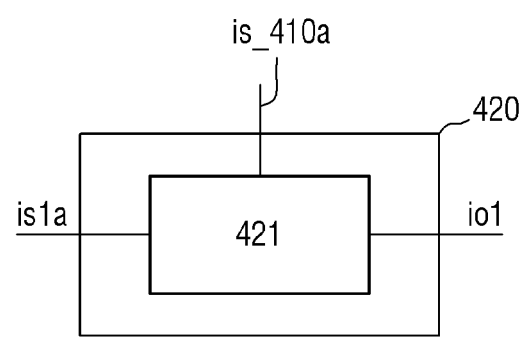
FIG. 7 is a block diagram further illustrating in one embodiment the first output image generator 420 of FIG. 5.

FIG. 7 is a block diagram illustrating in one embodiment the first output image generation unit 420 of the first image generator 400 of FIG. 5.

Referring to FIG. 7, the first output image generation unit 420 may include an out-focus unit 421. The out-focus unit 421 may convert the output signal is1a of the first signal processor 310 into the first output image io1, using the depth information is_410a. The out-focus unit 421, for example, may provide an out-focusing effect to the output signal is1a of the first signal processor 310.

Referring again to FIG. 5, the second output image generation unit 430 may receive the input of the two image signals isb and is1a and the corresponding disparity information is_410b to generate a second output image io2.

Figure 8:
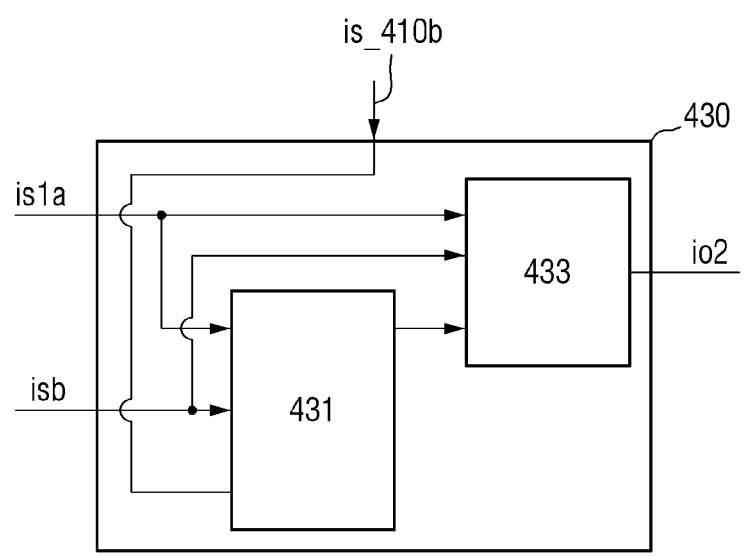
FIG. 8 is a block diagram further illustrating in one embodiment the second output image generation unit 430 of FIG. 5.

FIG. 8 is a block diagram further illustrating in one embodiment the second output image generation unit 430 of the first image generator 400 of FIG. 5.

Referring to FIG. 8, the second output image generation unit 430 may include a pixel mapping unit 431 and a mixing unit 433. The pixel mapping unit 431 may generate a pixel map of the two image signals isb and is1a, using the corresponding disparity information is_410b. The mixing unit 433 may receive the input of the two image signals isb and is1a and mix the two image signals isb and is1a using the output of the pixel mapping unit 431 to generate a single second output image io2.

Referring again to FIG. 5, when the selection signal SS includes information corresponding to the first condition C1, the third output image generation unit 440 may scale one of the output signal is1a of the first signal processor 310 and the output signal isb of the second signal processor 320 to generate the third output image io3. For example, when the processor (1120 of FIG. 1) is an application processor AP built in the cellular phone and the selection signal (SS of FIG. 1) includes information corresponding to the first condition (C1 of FIG. 1), a zoom mode may be supported for the user.

When the scale ratio is low (i.e., in a third condition C3), the output signal is1a of the first signal processor 310 may be provided to the output image generation unit 440 by the zoom selector 441. The third output image generation unit 440 may scale the output signal is1a of the first signal processor 310 to generate a third output image io3. That is, when the zoom selection signal SS_ZOOM includes information corresponding to the third condition C3, the zoom selector 441 may provide the output signal is1a of the first signal processor 310 to the third output image generation unit 440. Here, the third condition C3 may be, for example, a case wherein the angle of view associated with the third output image io3 generated by the third output image generation unit 440 is less than the angle of view associated with the second image (id2 of FIG. 1).

When the scale ratio increases and the angle of view associated with the third output image io3 generated by the third output image generation unit 440 is greater than or equal to the angle of view associated with the second image (id2 of FIG. 1) (i.e., in a fourth condition C4), the zoom selector 441 may output the output signal isb of the second signal processor 320 to the third output image generation unit 440. The third output image generation unit 440 may scale the output signal isb of the second signal processor 320 to generate a third output image io3. That is, when the zoom selection signal SS_ZOOM includes information corresponding to the fourth condition C4, the zoom selector 441 may output the output signal isb of the second signal processor 320 to the third output image generation unit 440. At this time, the fourth condition C4 may be, for example, a case where the angle of view of the third output image io3 generated by the third output image generation unit 440 is equal to or larger than the angle of view of the second image (id 2 of FIG. 1).

The zoom selection signal SS_ZOOM may be determined by the user who selects the scale ratio, for example, when the processor (1120 of FIG. 1) is an application processor AP built in the mobile phone. For example, the zoom selection signal SS_ZOOM may be generated by the zoom selection signal generator. The zoom selection signal generator may generate the zoom selection signal SS_ZOOM, using information on the scale ratio selected by the user. The zoom selection signal generator may be provided as software in some embodiments.

Referring again to FIG. 1, the output image io which is the output of the first image generator 400 may be one of the first output image io1 and the second output image io2. For example, one of the first output image io1, the second output image io2, and the third output image io3 may be output as the output image io in accordance with the mode of the predetermined image system. For example, when the processor 1120 is an application processor AP built in the cellular phone, one of the first output image io1, the second output image io2 and the third output image io3 may be output to the liquid crystal screen of the mobile phone.

Hereinafter, an image processing device according to some embodiments of the present inventive concept will be described with reference to FIG. 9 and FIG. 10.

Figure 9:
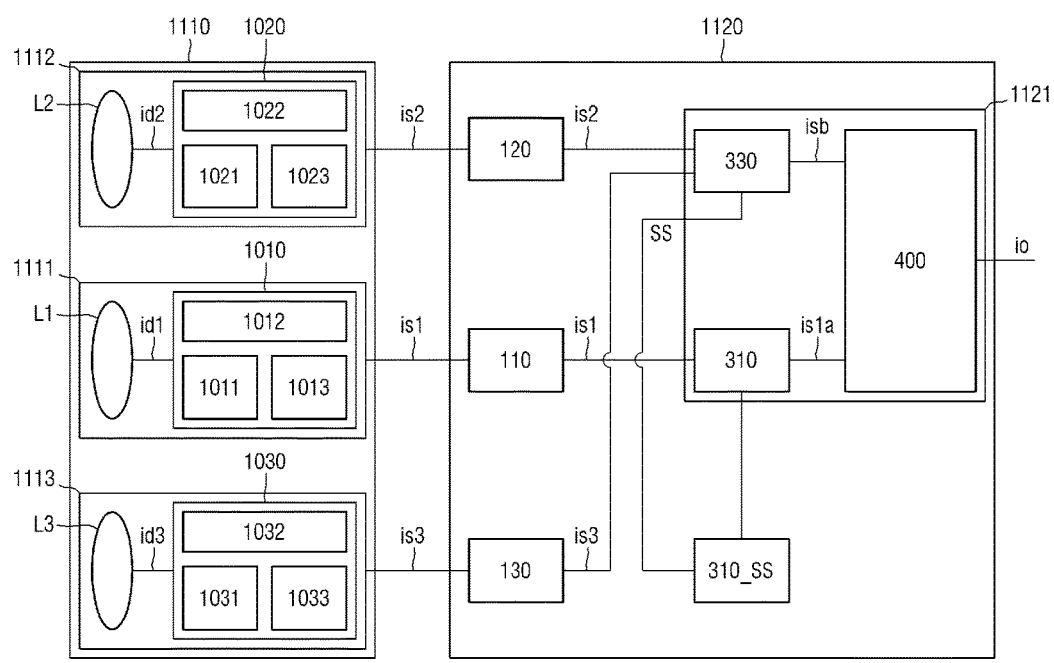
FIG. 9 is another block diagram illustrating an image processing device according to some embodiments of the inventive concept.
Figure 10:
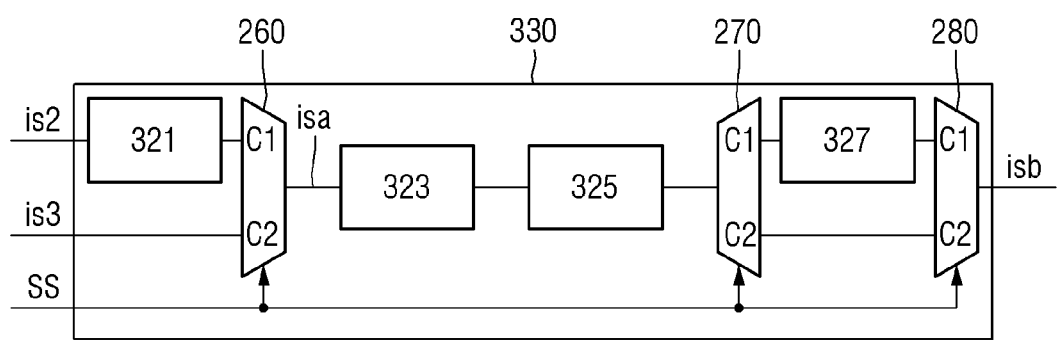
FIG. 10 is a block diagram further illustrating in one embodiment the third signal processor 330 of FIG. 9.

FIG. 9 is a block diagram illustrating an image processing device according to some embodiments of the inventive concept, and FIG. 10 is a block diagram further illustrating in one embodiment the third signal processor 330 of FIG. 9.

Referring to FIGS. 9 and 10, the third signal processor 330 may include a sixth selector 260 which outputs one of the second image signal is2 or the third image signal is3. The third signal processor 330 may further include a third format converter 321, a second noise removal unit 323, a second image enhancer 325, a seventh selector 270, a fourth format converter 327, and an eighth selector 280. The selection signal SS which is input to the sixth through eighth selectors 260, 270, and 280 may be input to the third signal processor 330.

The third signal processor 330 may receive the input of the second image signal is2 and the third image signal is3. The second image signal is2 may be input to the sixth selector 260 via the third format converter 321. The third image signal is3 may be input to the sixth selector 260.

The sixth selector 260 may output the output signal of the third format converter 321 based on the selection signal SS under the first condition C1. In addition, the sixth selector 260 may output the third image signal is3 based on the selection signal SS under the second condition C2. In other words, the sixth selector 260 may perform the same function as the first selector (210 of FIG. 1) described with reference to FIG. 1.

The output signal isa of the sixth selector 260 may be input to the seventh selector 270 via the second noise removal unit 323 and the second image enhancer 325.

The seventh selector 270 may connect the input terminal of the fourth format converter 327 and the input terminal of the second image enhancer 325, based on the selection signal SS under the first condition C1. Meanwhile, the seventh selector 270 may output the output signal of the second image enhancer 325 as the output signal isb of the third signal processor 330, based on the selection signal SS under the second condition C2.

Figure 11:
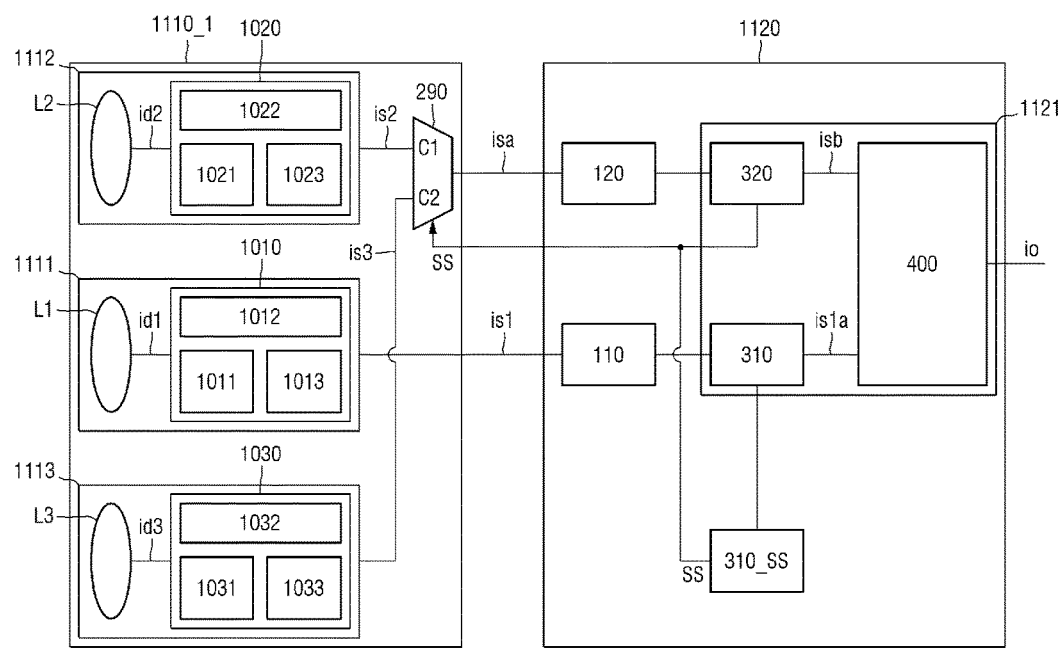
FIGS. 11 and 12 are respective block diagrams of an image processing device according to still other embodiments of the inventive concept.

FIG. 11 is a block diagram of an image processing device according to some embodiments of the inventive concept.

Referring to FIG. 11, the camera module 1110 may include a ninth selector 290. The ninth selector 290 may select either the second image signal is2 or the third image signal is3 and output the image signal as the output signal isa. The ninth selector 290 may perform substantially the same function as the first selector (210 of FIG. 1) described with reference to FIG. 1.

The camera module 1110 may provide the first image signal is1 and the output signal isa of the ninth selector 290 to the processor 1120. The processor 1120 may include a first interface 110, a second interface 120, and an image processor 1121. The image processor 1121 may include a first signal processor 310, a second signal processor 320, and a first image generator 400.

Figure 12:
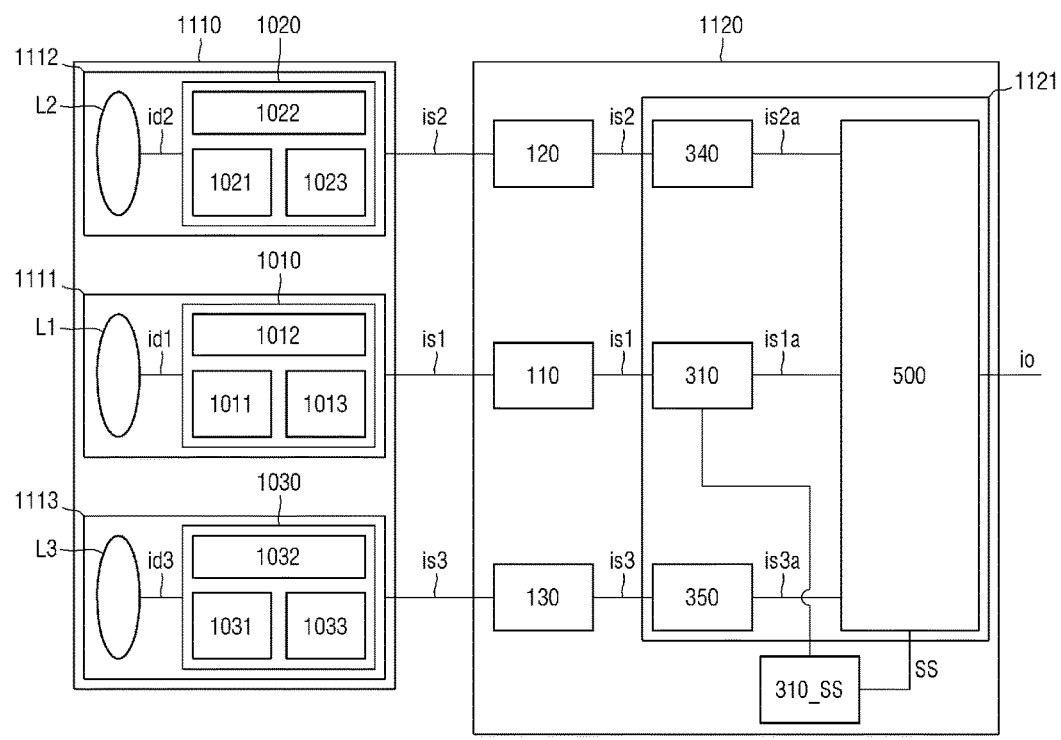
Figure 13:
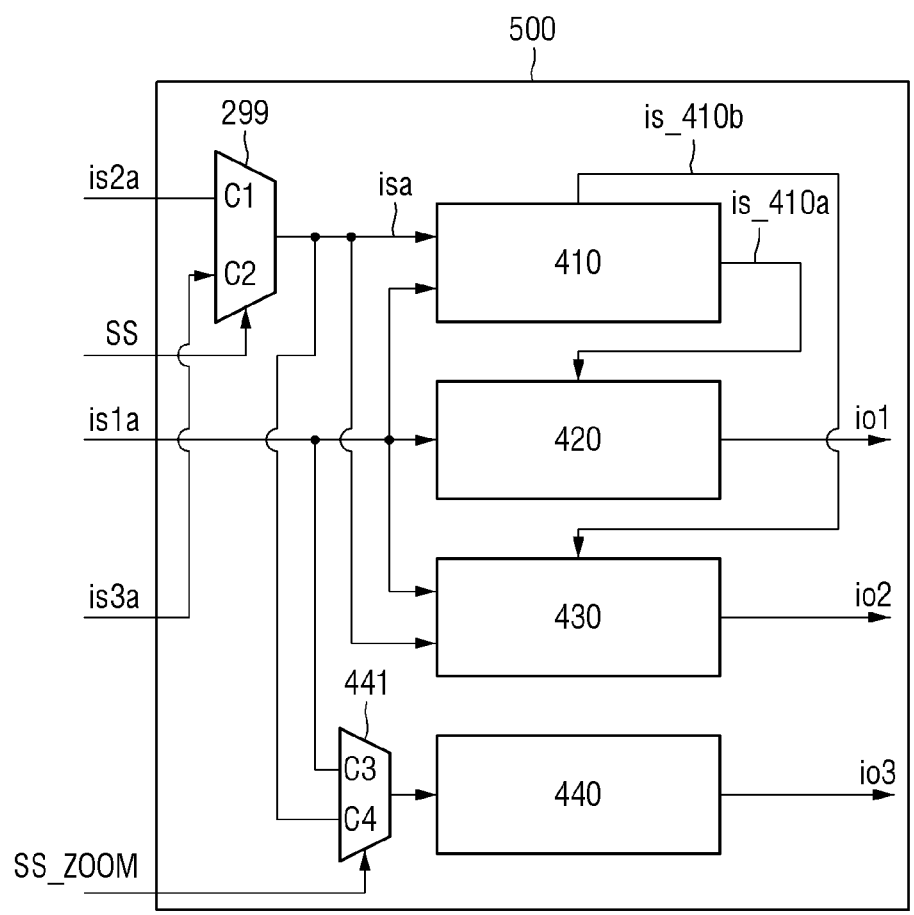
FIG. 13 is a block diagram further illustrating the second image generator 500 of FIG. 12.

FIG. 12 is a block diagram illustrating an image processing device according to some embodiments of the inventive concept, and FIG. 13 is a block diagram further illustrating in one embodiment the second image generator 500 of FIG. 12.

Referring to FIGS. 12 and 13, the image processor 1121 may receive the input of the first through third image signals is1 and is3. The image processor 1121 may include a first signal processor 310, a fourth signal processor 340, a fifth signal processor 350, and a second image generator 500. The second image generator 500 may include a tenth selector 299 that receives the output signal is2*a* of the fourth signal processor 340 and the output signal is3*a* of the fifth signal processor 350 to output one of the output signal is2*a* of the fourth signal processor 340 and the output signal is3*a* of the fifth signal processor 350 on the basis of the selection signal SS.

The fourth signal processor 340 may receive the second image signal is2 passed through the second interface 120 and execute the first image signal processing to output the output signal isa. The fifth signal processor 350 may receive the third image signal is3 passed through the third interface 130 and execute the first image signal processing to output the output signal is3*a*. The fourth signal processor 340 and the fifth signal processor 350 may be substantially the same as the first signal processor (310 of FIG. 1) described with reference to FIGS. 1 and 3.

The output signal is1*a* of the first signal processor 310, the output signal is2*a* of the fourth signal processor 340, and the output signal is3*a* of the fifth signal processor 350 may be provided to the second image generator 500.

The tenth selector 299 included in the second image generator 500 may perform substantially the same function as the first selector 210 described with reference to FIG. 1. Therefore, the output signal isa under the first condition C1 may be the output signal is2*a* of the fourth signal processor 340, and the output signal isa under the second condition C2 may be the output signal is3*a* of the fifth signal processor 350.

The depth information generation unit 410 may receive the input of the output signal isa of the tenth selector 299 and the output signal is1*a* of the first signal processor 310 to generate the depth information is_410*a* and the corresponding disparity information is_410*b*. The first output image generation unit 420 may receive the input of the output signal is1*a* of the first signal processor 310 and the depth information is_410*a* to generate the first output image io1. The second output image generation unit 430 may receive the input of the output signal is1*a* of the first signal processor 310, the output signal isa of the tenth selector 299, and the corresponding disparity information is_410*b* to generate the second output image io2. The third output image generation unit 440 may generate the third output image io3, using the output signal of the zoom selector 441.

Hereinafter, an image processing method according to some embodiments of the present inventive concept will be described with reference to FIG. 14. For the sake of clarity of explanation, repeated descriptions of those described above will not be provided.

Figure 14:
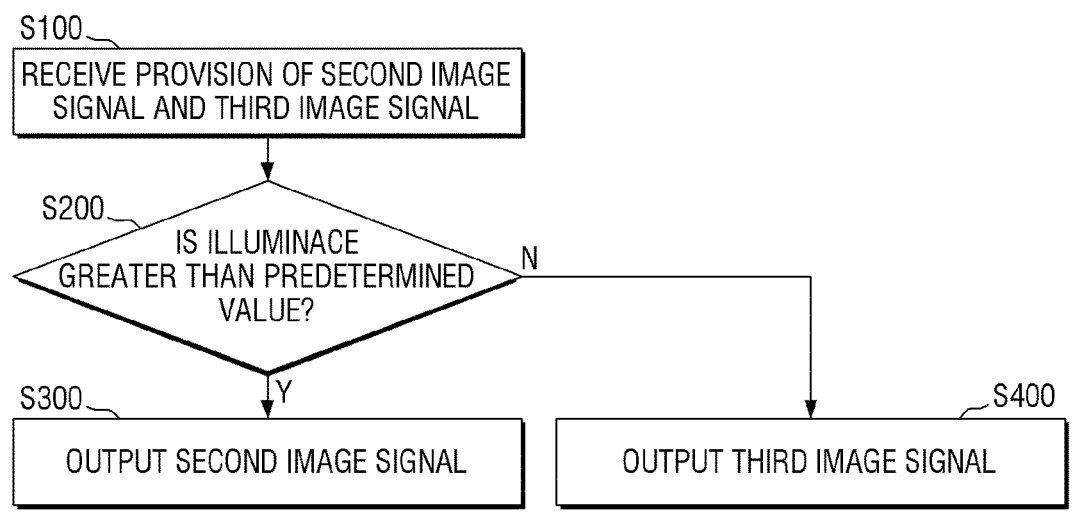
FIG. 14 is a flowchart summarizing method steps that may be performed by various selector elements according to some embodiments of the inventive concept.

FIG. 14 is a flow chart summarizing certain method steps that may be performed by any one of the first selector (210 of FIG. 1), the sixth selector (260 of FIG. 10), the ninth selector (290 of FIG. 11), and the tenth selector (299 of FIG. 13) according to some embodiments of the inventive concept.

Referring to FIG. 14, a second image signal and a third image signal may be provided (S100).

Specifically, for example, the selector (210 in FIG. 1, 260 in FIG. 10, 290 in FIG. 11, and 299 in FIG. 13) may receive the provision of the second image signal is2 generated from the second camera module (1112 in FIGS. 1, 9, 11, and 12), and the third image signal is3 generated from the third camera module (1113 in FIGS. 1, 9, 11, and 12).

A comparison between the illuminance and the predetermined value is made (S200). When the illuminance is greater than or equal to the predetermined value (i.e., the first condition C1), the selector (210 in FIG. 1, 260 in FIG. 10, 290 in FIG. 11, and 299 in FIG. 13) may output the second image signal is2. When the illuminance is less than the predetermined value (i.e., the second condition C2), in step S400, the selector (210 in FIG. 1, 260 in FIG. 10, 290 in FIG. 11, and 299 in FIG. 13) may output the third image signal is3.

The image processor 1121 may include generation of the output image io, using the first image signal is1 and the output signal of the selector (210 in FIG. 1, 260 in FIG. 10, 290 in FIG. 11, and 299 in FIG. 13).

An image processing device according to embodiments of the inventive concept may include a selector (210 in FIG. 1, 260 in FIG. 10, 290 in FIG. 11, and 299 in FIG. 13) which selects and outputs one of the second image signal is2 and the third image signal is3.

In the case of the first condition C1, the selector (210 in FIG. 1, 260 in FIG. 10, 290 in FIG. 11, and 299 in FIG. 13) may select and output the second image signal is2 (or the output signal is2*a* of the fourth signal processor (340 in FIG. 12)). The image processor 1121 may generate the output image io, using the first image signal is1 generated from the first camera module (1111 in FIGS. 1, 9, 11 and 12) and the second image signal is2 generated from the second camera module (1112 in FIGS. 1, 9, 11 and 12). The first lens L1 of the first camera module (1111 in FIGS. 1, 9, 11 and 12) is a wide angle lens, and the second lens L2 of the second camera module (1112 in FIGS. 1, 9, 11 and 12) may be a telephoto lens. Therefore, when the illuminance is relatively high, the zoom operation performance of the image processing device may be improved.

In the case of the second condition C2, the selector (210 of FIG. 1, 260 of FIG. 10, 290 of FIG. 11, and 299 of FIG. 13) may select and output the output signal of the third image signal is3 (or the output signal is3a of the fifth processor (350 in FIG. 12)). The processor 1120 may generate the output image io, using the first image signal is1 generated from the first camera module (1111 in FIGS. 1, 9, 11 and 12) and the third image signal is3 generated from the third camera module (113 in FIGS. 1, 9, 11, and 12). The first image sensor 1011 of the first camera module (1111 in FIGS. 1, 9, 11 and 12) may be a color image sensor, and the third image sensor of the third camera module (1113 in FIGS. 1, 9, 11 and 12) may be a black and white image sensor. When the illuminance is relatively low, the black and white image sensor may have higher sensitivity of the image than the color image sensor. Therefore, when the illuminance is relatively low, the quality of the output image io of the image processing device may be improved.

Figure 15:
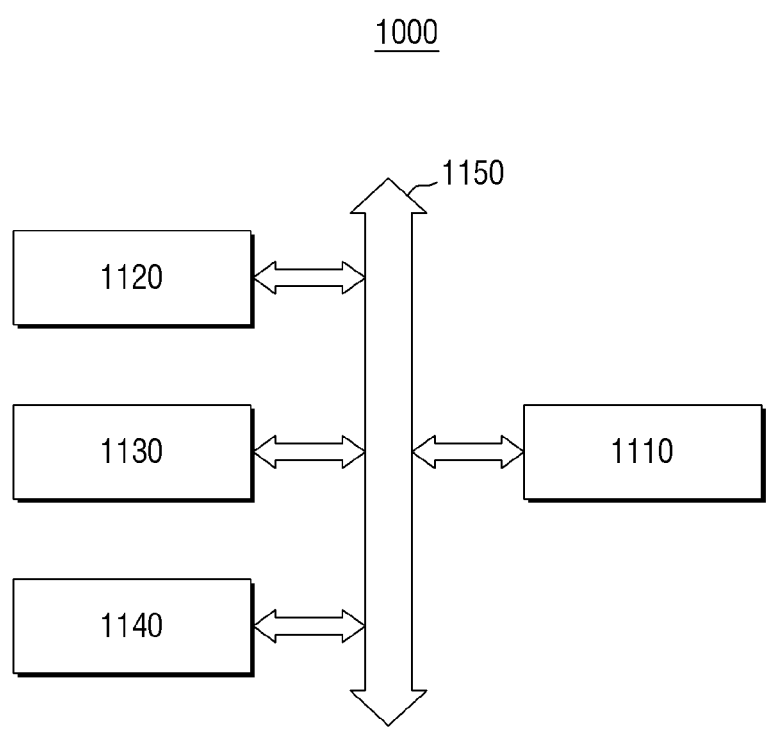
FIG. 15 is a general block diagram of an image system that may be configured to include an processing device according to some embodiments of the inventive concept.
Figure 16:
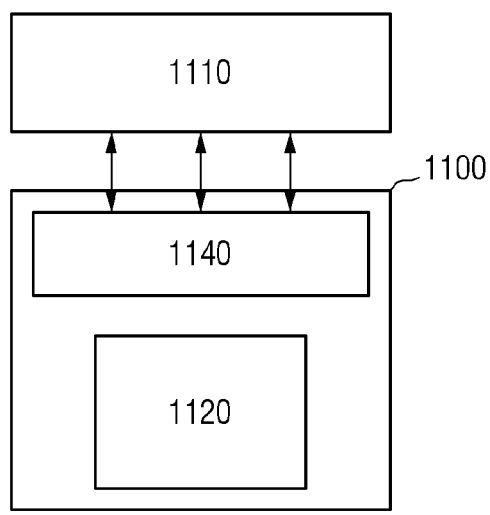
FIG. 16 is a general block diagram illustrating part of an image system including an image processing device according to some embodiments of the inventive concept.

FIG. 15 is a general block diagram of an image system including the image processing device according to some embodiments of the inventive concept. FIG. 16 is a general block diagram illustrating part of an image system including the image processing device according to some embodiments of the inventive concept.

Referring to FIG. 15, the image system may include a camera module 1110, a processor 1120, a storage device 1130, an interface 1140 and a bus 1150. The camera module 1110, the processor 1120, the storage device 1130 and/or the interface 1140 may be interconnected via the bus 1150. The bus 1150 may correspond to a path through which data is transferred between the camera module 1110, the processor 1120, the storage device 1130, and/or the interface 1140.

The storage device 1130 may store data and/or commands and the like. The interface 1140 may perform the function of transferring data to the communication network or receiving data from the communication network. The interface 1140 may be in wired or wireless form. For example, the interface 1140 may include an antenna or wired/wireless transceiver and the like.

Although it is not illustrated, the image system may further include a high-speed DRAM and/or SRAM, as an operation memory for improving the operation of the camera module 1110 and the processor 1120.

The image system may be applied to a personal digital assistant (PDA), a portable computer, a web tablet, a wireless phone, a mobile phone, or all electronic products that can transmit and/or receive information under the wireless circumstance.

In some embodiments, the image system may be applied to the mobile phones. For example, referring to FIG. 16, the processor 1120 and the interface 1140 may be disposed on the board 1100 and provided in the form of a single board. The camera module 1110 may communicate with the processor 1120 via the interface 1140. The substrate 1100 may be, for example, a substrate of a mobile phone. The processor 1120 may be, for example, an application processor AP built in a mobile phone.

While the present inventive concept has been particularly illustrated and described with reference to exemplary embodiments thereof, it will be understood by those of ordinary skill in the art that various changes in form and detail may be made therein without departing from the spirit and scope of the present inventive concept as defined by the following claims. The exemplary embodiments should be considered in a descriptive sense only and not for purposes of limitation.

What is claimed is:

1. An image processing device comprising:
    a first lens, a second lens disposed on one side of the first lens, and a third lens disposed on the other side of the first lens;
    a first image sensor that receives a first image via the first lens and generates a first image signal, a second image sensor that receives a second image via the second lens and generates a second image signal, and a third image sensor that receives a third image via the third lens and generates a third image signal;
    a selector that receives the second image signal and the third image signal and provides either the second image signal under a first condition or the third image signal under a second condition different from the first condition as a first image output signal; and
    an image processor that performs image processing using the first image output signal,
    wherein the first condition is a condition wherein illuminance is greater than or equal to a predetermined value, and
    the second condition is a condition wherein the illuminance is less than the predetermined value.

2. The image processing device of claim 1, wherein the first lens and the third lens are wide-angle lenses, and the second lens is a telephoto lens.

3. The image processing device of claim 1, wherein the first image sensor and the second image sensor are color image sensors, and the third image sensor is a monochrome image sensor.

4. The image processing device of claim 1, wherein the second lens is spaced apart from the first lens by a first distance, the third lens is spaced apart from the first lens by a second distance equal to the first distance.

5. The image processing device of claim 1, wherein the image processor comprises:
    a first signal processor that receives the first image signal and performs a first image signal processing; and
    a second signal processor that receives the first image output signal from the selector and performs a second image signal processing different from the first image signal processing.

6. The image processing device of claim 1, wherein the image processor comprises:
    a first signal processor that receives the first image signal and performs a first image signal processing; and
    a second signal processor that receives the first image output signal and performs a second image signal processing,
    wherein the selector is disposed external to at least one of the first signal processor and the second signal processor.

7. The image processing device of claim 1, wherein the image processing device comprises a camera module and a processor,
    the camera module includes the first lens, second lens, third lens, first image sensor, second image sensor, third image sensors, and the selector, and the processor includes the image processor.

8. The image processing device of claim 1, wherein the selector and the image processor are disposed in an application processor.

9. The image processing device of claim 1, wherein the image processor comprises:
  an image generator including the selector;
  a first signal processor that receives the first image signal and performs the first image signal processing to provide the first image output signal to the image generator;
  a fourth signal processor that receives the second image signal and performs a fourth image signal processing to provide a second image output signal to the selector; and
  a fifth signal processor that receives the third image signal and performs a fifth image signal processing to provide the third output image signal to the selector.

10. The image processing device of claim 1, further comprising:
  a first signal processor that receives the first image signal and performs the first image signal processing to provide the first output image signal to the image processor,
  wherein the selector operates in response to a selection signal output from the first signal processor.

11. A processor comprising:
  an image processor that receives a first image signal from a first camera module; and
  a first selector that receives a second image signal from a second camera module and a third image signal from a third camera module, and provides one of the second image signal under a first condition or the third image signal under a second condition different from the first condition as a first image output signal,
  wherein the image processor performs image processing, using the first image output signal, and
  the first condition is a condition wherein illuminance is greater than or equal to a predetermined value, and the second condition is a condition wherein the illuminance is less than the predetermined value.

12. The processor of claim 11, wherein the image processor comprises:
  a first signal processor that receives the first image signal and performs a first image signal processing; and
  a second signal processor that receives the first image output signal and performs a second image signal processing.

13. The processor of claim 11, wherein the image processor comprises:
  a first signal processor that receives the first image signal and performs a first image signal processing; and
  a third signal processor that receives the second image signal and the third image signal and performs a third image signal processing,
  wherein the third signal processor includes the first selector.

14. The processor of claim 13, wherein the third signal processor comprises a second selector receiving an output of the first selector, and a format converter connected to the second selector,
  wherein the first selector outputs the second image signal, the second selector provides the output of the first selector to the format converter, and
  the first selector outputs the third image signal, the second selector does not provide the output of the first selector to the format converter.

15. The processor of claim 11, wherein the image processor comprises:
  an image generator including the first selector;
  a first signal processor that receives the first image signal and performs the first image signal processing to provide the first image signal to the image generator;
  a fourth signal processor that receives the second image signal and performs fourth image signal processing to provide the second image signal to the first selector; and
  a fifth signal processor that receives the third image signal and performs fifth image signal processing to provide the third image signal to the first selector.

16. The processor of claim 11, wherein the processor is an application processor.

17. A method for image processing comprising:
  receiving a first image signal from a first camera module by a first signal processor to perform first image signal processing;
  receiving a second image signal from a second camera module and receiving a third image signal from a third camera module by a selector to output the second image signal under a first condition and output the third image signal under a second condition different from the first condition; and
  generating an output image by an image processor, using a output signal of the first signal processor and a output signal of the selector,
  wherein the first condition is a condition wherein illuminance is greater than or equal to a predetermined value, and
  the second condition is a condition wherein the illuminance is less than the predetermined value.

* * * * *